United States Patent
Fourberg et al.

(10) Patent No.: US 10,106,462 B2
(45) Date of Patent: Oct. 23, 2018

(54) TWO-COMPONENT SYSTEM, IN PARTICULAR FOR FORMING AN ADHESIVE

(71) Applicant: HÜTTENES-ALBERTUS CHEMISCHE WERKE GMBH, Düsseldorf (DE)

(72) Inventors: Christian Fourberg, Mönchengladbach (DE); Ditmar Baier, Haltern am See (DE)

(73) Assignee: HÜTTENES-ALBERTUS CHEMISCHE WERKE GMBH, Düsseldorf (DE)

( * ) Notice: Subject to any disclaimer, the term of this patent is extended or adjusted under 35 U.S.C. 154(b) by 0 days.

(21) Appl. No.: 15/106,030

(22) PCT Filed: Dec. 19, 2014

(86) PCT No.: PCT/EP2014/078898
§ 371 (c)(1),
(2) Date: Jun. 17, 2016

(87) PCT Pub. No.: WO2015/097108
PCT Pub. Date: Jul. 2, 2015

(65) Prior Publication Data
US 2016/0311724 A1    Oct. 27, 2016

(30) Foreign Application Priority Data
Dec. 23, 2013    (DE) .................. 10 2013 227 151

(51) Int. Cl.
| | | |
|---|---|---|
| *C04B 28/26* | (2006.01) | |
| *C04B 40/06* | (2006.01) | |
| *B29C 65/48* | (2006.01) | |
| *B32B 37/12* | (2006.01) | |
| *C04B 103/10* | (2006.01) | |
| *C04B 111/00* | (2006.01) | |
| *B29K 67/00* | (2006.01) | |
| *B29L 9/00* | (2006.01) | |

(52) U.S. Cl.
CPC ............ *C04B 28/26* (2013.01); *B29C 65/483* (2013.01); *B32B 37/12* (2013.01); *C04B 40/065* (2013.01); *B29K 2067/04* (2013.01); *B29L 2009/00* (2013.01); *B32B 2315/02* (2013.01); *C04B 2103/10* (2013.01); *C04B 2111/0087* (2013.01); *C04B 2111/00672* (2013.01); *C04B 2111/00939* (2013.01)

(58) Field of Classification Search
CPC ........ C04B 28/26; B29C 65/483; B32B 37/12
See application file for complete search history.

(56) References Cited

U.S. PATENT DOCUMENTS

| | | |
|---|---|---|
| 3,881,947 A | 5/1975 | Palmer |
| 4,533,490 A | 8/1985 | Kluth et al. |
| 5,795,104 A | 8/1998 | Schanze |

FOREIGN PATENT DOCUMENTS

| | | |
|---|---|---|
| AT | 365103 | 12/1981 |
| CN | 103113079 | 5/2013 |
| JP | 49-009424 | 1/1974 |
| JP | 09-118873 | 6/1997 |
| JP | 2003026462 | 1/2003 |
| WO | 98/49118 | 11/1998 |

OTHER PUBLICATIONS

Peilin et al., "Handbook of Polyester Materials", pp. 612-615, Chemical Industry Press, Jul. 2002.

*Primary Examiner* — Jessee Roe
*Assistant Examiner* — Alexander Polyansky
(74) *Attorney, Agent, or Firm* — Duane Morris LLP; J. Rodman Steele, Jr.; Gregory M. Lefkowitz

(57) ABSTRACT

Described is a two-component system, particularly for forming an adhesive, which is suitable, for example, for applications in the foundry industry and in the construction industry.

20 Claims, No Drawings

TWO-COMPONENT SYSTEM, IN PARTICULAR FOR FORMING AN ADHESIVE

CROSS-REFERENCE TO RELATED APPLICATIONS

This application is a § 371 national stage entry of International Application No. PCT/EP2014/078898 filed Dec. 19, 2014, which claims priority to German Patent Application No. 10 2013 227 151.4 filed Dec. 23, 2013, the entire contents of which are incorporated herein by reference.

BACKGROUND OF THE INVENTION

The present patent application concerns a two-component system, particularly for forming an adhesive, which is suitable, for example, for applications in the foundry industry and/or in the construction industry.

In the foundry industry, adhesive bonds between parts of foundry molds are presently often produced using organic hotmelt adhesives or polyurethane adhesives (in the form of two-component systems) or thermally curing inorganic waterglass adhesives.

Hotmelt adhesives, whose bonding effect is brought about through solidification of a melt, have to be melted before being used. This entails a relatively high cost in terms of apparatus and of time.

Organic adhesives are a disadvantage in the foundry industry, since at the high temperatures to which casting molds and casting cores are exposed, they give off volatile organic compounds (VOCs) and hence may give rise to defects (gas bubbles) in the fabricated casting.

In order to lower the emission of volatile organic compounds (VOCs) in foundries, therefore, mold materials with inorganic binders are increasingly being used for producing molds and cores. In this context it is desirable also to use adhesives which do not give rise to emissions of volatile organic compounds, or do so only to a small extent. Moreover, the compatibility between organic adhesives and mold materials bound by an inorganic binder, in terms of the materials involved, is often not very high, to the detriment of the reliability of the adhesive bonds.

The problems caused by the use of organic adhesives can be avoided if they are replaced by inorganic adhesives such as thermosetting waterglass adhesives. Thermosetting of waterglass-based adhesives, however, requires the removal of water, i.e., drying at elevated temperature, in an oven or a microwave heater, for example. This entails a relatively high cost in terms of apparatus and time. Moreover, there is a risk of incomplete curing of the waterglass, so making the resultant adhesive bonds sensitive to changes in atmospheric humidity.

Also known, besides the thermal curing of waterglass by removal of water, is the chemical curing of waterglass by means of carbon dioxide or by means of esters as curing agents.

EP 0 641 748 A1 discloses a composition for fastening plugs, threaded rods, and the like in cavities, especially drilled holes, in concrete, masonry, and brickwork, based upon waterglass with at least one fine-particle, high-activity coreactant such as $SiO_2$ and/or $Al_2O_3$, for example, and also with fillers, such as finely ground quartz and/or silica sand, for example, where the waterglass has a molar ratio of $SiO_2$ to alkali metal oxide of >1.4, preferably 1.45 to 1.60, but <2, and the composition further comprises, based on 100 parts by weight of waterglass, 10 to 40 parts by weight of a curing agent which neutralizes the alkali metal of the waterglass with elimination of an acid which is stronger than silicic acid. In the method for producing a composition of this kind, the waterglass is introduced initially (optionally together with a liquefying agent), the high-activity coreactants (such as $SiO_2$ and/or $Al_2O_3$, for example) are added with stirring, and then, likewise with stirring, the fillers are added, and subsequently, at a high stirring speed, the curing agent is added. The compositions produced accordingly have pot lives of 25 minutes up to one hour and obtain their ultimate strength after 30 hours or more.

DETAILED DESCRIPTION OF THE INVENTION

The object of the present invention is to provide compositions and methods for producing fast-curing, reliable adhesive bonds particularly for foundry applications. The process of curing is to take place preferably without supply of thermal energy, and is preferably not to be influenced to any relevant extent by the temperature of the articles to be bonded.

The compositions and methods of the invention are not to require any high level of technical cost or complexity in their practice. The fraction of organic substances to be used in producing the adhesive bonds is to be small.

This object is achieved in accordance with the invention by means of a two-component system, in particular for forming an adhesive, comprising or consisting of
  a component (A) comprising the constituents
  (A-i) an alkali metal silicate or a mixture of two or more than two alkali metal silicates, the molar ratio of silicon dioxide to alkali metal oxide in the alkali metal silicate or silicates being in the range from 2 to 5, and
  (A-ii) water
  and
  a component (B) comprising the constituent
  (B-i) a compound selected from the group consisting of cyclic esters of carbonic acid, γ-butyrolactone, and carboxylic esters of polyhydric alcohols, or a mixture of two or more than two of these compounds,
  where the ratio
  of the total mass of all alkali metal silicates (A-i) of component (A)
  to
  the total mass of constituent (B-i) of component (B)
  is in the range from 2:1 to 8:1, preferably in the range from 3:1 to 5:1,
  and in the two-component system, components (A) and (B) are arranged in such a way that no constituent of component (A) is able to react with a constituent of component (B).

Within the two-component system of the invention, reactive contact of constituents of component (A) with constituents of component (B) is prevented, by, for example, component (A) on the one hand and component (B) on the other each being provided in a dedicated container, or by component (A) on the one hand and component (B) on the other each being provided in a separate chamber of a container (e.g., of a double-chamber cartridge).

In the two-component system of the invention, component (A) and also component (B) are present preferably in the form of paste or gel. The water content of component (A) is therefore preferably selected such that the alkali metal silicates (as defined above) present in component (A) are not fully dissolved. The water content of component (A) is typically 60 wt % or less, typically 30 wt % to 50 wt % of the total mass of component (A), more preferably 35 wt % to 45 wt %, based in each case on the total mass of component (A).

Constituent (B-i) of component B is intended to act as a curing agent for the alkali metal silicates present as constituent (A-i) in component (A). The curing of alkali metal silicates (waterglass) by esters is familiar from the technical field of the binders for foundry mold materials (waterglass-ester process). The function of constituent (B-i) here may be described generally as that of an activator for the curing of the waterglass. The curing of waterglass leads to the formation of polysilicic acids, which have a high strength.

Since the ester, and the products formed on ester cleavage, are not themselves a constituent of the curing product, just relatively small amounts of constituent (B-i), relative to constituent (A-i), are enough to bring about the curing of the waterglass. Accordingly, as is desirable particularly for foundry applications, the fraction of organic constituents in the two-component system of the invention can be kept small. Two-component systems of the invention with a small fraction of organic compounds are also suitable for applications where the fire prevention requirements are exacting.

In the alkali metal silicates for use as constituent (A-i) in accordance with the invention, the molar ratio of silicon dioxide to alkali metal oxide is preferably in the range from 2 to 5, more preferably 2.5 to 3.8.

The two-component system of the invention is especially suitable for producing an adhesive by mixing of components (A) and (B) of the two-component system of the invention in a static mixing apparatus.

Static mixing apparatuses are apparatuses for continuous mixing of substances, and comprise a tube provided with suitable stationary internals. The material for mixing is transported through the tube by the application of a pressure difference. The internals disposed within the tube are designed so as to bring about repeated division and recombination of the stream of mixing material and/or to develop turbulences, thereby minimizing differences in concentration and/or inhomogeneities within the stream of mixing material. Suitable forms of the internals for static mixing apparatuses are known to the skilled person. The internals may be designed, for example, such that the stream of mixing material is required to pass through a labyrinthine region.

Static mixing apparatuses are distinguished relative to dynamic mixing apparatuses, typically, by lower capital costs, maintenance costs, and operating costs, since they have a smaller number of moving apparatus components.

Through a static mixing apparatus it is possible to achieve intimate, homogeneous commixing of components (A) and (B) and thereby in turn to achieve uniform curing of the mixture formed, and a reliable, robust adhesive bond. Component (A) preferably has, at a temperature of 20° C., a dynamic viscosity in the range from 1 Pa*s to 70 Pa*s, determined according to DIN 53019-01 using a VT 550 rotary viscometer from Haake with a rotating spindle 100. Component (B), at a temperature of 20° C., preferably has a dynamic viscosity in the range from 0.1 Pa*s to 20 Pa*s, preferably 1 Pa*s to 20 Pa*s, determined by DIN 53019-01 using a VT 550 rotary viscometer from Haake with spindle SV1 and measuring cup SV from Haake.

In the case of pastelike materials, the sample, in the course of sample preparation, is conditioned to 20° C. The measuring spindle is then introduced down to the insertion mark. In the low-stress condition of the measurement setup, the torque load cell is set at zero. Measurement then takes place until the measured value is constant at the mandated speed. Thixotropic behavior should be taken into account here.

The upper limits of the dynamic viscosities of component (A) and of component (B) are defined in particular in that high-viscosity substances are difficult to handle and difficult in their miscibility with one another. The lower limits of the dynamic viscosities of component (A) and of component (B) are defined in particular in that the adhesive on application to a bond site is not to flow out uncontrolledly beyond the confines of the bond site.

Preferred two-component systems of the invention are those in which the ratio of the viscosity of component (A) to the viscosity of component (B) is in the range from 1:4 to 30:1. By means of this preferred embodiment, it is possible to achieve particularly intimate, homogeneous commixing of the two components, and so in turn to achieve uniform curing of the mixture formed, and a reliable, robust adhesive bond.

For neither component (A) nor component (B) of the two-component system of the invention is the presence of further constituents, other than the above-defined constituents (A-i), (A-ii) and (B-i), ruled out.

Component (A) may be formed, for example, by a conventional thermosetting waterglass adhesive.

In one preferred embodiment, component (B) of the two-component system of the invention comprises as further constituents (B-ii) amorphous silica, where the amorphous silica is preferably selected from the group consisting of fumed silicas, precipitated silicas, silica fume, and mixtures thereof, and/or (B-iii) one or more zeolites.

More preferably, component (B) of the two-component system of the invention comprises as further constituents (B-ii) amorphous silicon dioxide, the amorphous silicon dioxide being preferably selected from the group consisting of fumed silicas, precipitated silicas, silica fume, and mixtures thereof, the mass fraction of constituent (B-ii) being preferably 20 wt % or less, based on the total mass of component (B), and/or (B-iii) one or more zeolites, the mass fraction of constituent (B-iii) being preferably 40 wt % or less, based on the total mass of component (B).

Where component (B) comprises constituent (B-ii), the mass fraction of constituent (B-ii) as defined above is preferably 20 wt % or less, based on the total mass of component (B). The mass fraction of constituent (B-ii) is preferably 2 wt % to 20 wt %, more preferably 5 wt % to 15 wt %, based in each case on the total mass of component (B).

Where component (B) comprises constituent (B-iii), the mass fraction of constituent (B-iii) as defined above is preferably 40 wt % or less, based on the total mass of component (B). The mass fraction of constituent (B-iii) is preferably 10 wt % to 25 wt %, more preferably 10 wt % to 15 wt %, based in each case on the total mass of component (B).

Where component (B) comprises constituent (B-ii) and constituent (B-iii), the mass fraction of constituent (B-ii) as defined above is preferably 20 wt % or less and the mass fraction of constituent (B-iii) as defined above is preferably 40 wt % or less, based in each case on the total mass of component (B). The mass fraction of constituents (B-ii) and (B-iii) taken together is therefore preferably not more than 60 wt %, based on the total mass of component (B). It is preferred here for the mass fraction of constituent (B-ii) to be 2 wt % to 20 wt %, more preferably 5 wt % to 15 wt %, based in each case on the total mass of component (B), and for the mass fraction of constituent (B-iii) to be 10 wt % to 25 wt %, more preferably 10 wt % to 15 wt %, based in each case on the total mass of component (B).

Silica is a collective designation for compounds of the general formula $(SiO_2)_m \cdot nH_2O$. According to DIN 55943: 2001-10, silica is silicon dioxide which is produced by wet-chemical, thermal, or pyrogenic processes and which is characterized as amorphous by x-ray or electron diffraction.

Precipitated silicas (CAS No. 112926-00-8) are a finely divided amorphous form of silicon dioxide, produced by precipitation from aqueous alkali metal silicate solution (waterglass) with mineral acids, e.g., sulfuric acid, or with carbon dioxide.

Fumed silicas (also referred to as pyrogenic silicas, CAS No. 112945-52-5) are a finely divided amorphous form of silicon dioxide, produced by flame hydrolysis of silicon tetrachloride.

A further finely disperse amorphous form of silicon dioxide is the silica fume obtainable by reducing quartz with carbon in an arc furnace. A product of this kind, formed as a byproduct in the production of silicon and ferrosilicon by reduction of quartz with a carbon-containing material, is also referred to by the trade name "microsilica" (CAS No. 69012-64-2).

Amorphous silicon dioxide for use as constituent (B-ii) consists preferably of particles having a primary particle size in the range from 5 nm to 1 µm. One of the functions of the optional constituent (B-ii), amorphous silicon dioxide, is to influence the viscosity and/or thixotropy of component (B) and also to improve compatibility between component (B), comprising the organic constituent (B-i), and component (A), composed predominantly or exclusively of inorganic substances, in terms of the materials involved, and so to facilitate the mutual wetting and mixing of components (A) and (B). Moreover, in the mixture formed by mixing components (A) and (B), constituent (B-ii) raises the molar ratio of silicon dioxide to alkali metal oxide (see above) in comparison to the molar ratio of silicon dioxide to alkali metal oxide in constituent (A-i), and so accelerates the curing. The amorphous silicon dioxide of constituent (B-ii) participates in the curing of the waterglass and is incorporated into the resultant polysilicic acids. The mechanical properties of the material formed on curing, its contraction characteristics, and the adhesion to surfaces (for example, to the surfaces of the articles to be bonded in the context of use as an adhesive) are significantly enhanced through the addition of the amorphous silicon dioxide.

Since the above-described interactions between constituent (B-ii) of component (B), on the one hand, and component (A), more particularly its constituent (A-i), on the other, are to come about only when both components are mixed with one another to form an adhesive, the amorphous silicon dioxide (B-ii) is separate from the constituents of component (A) in the two-component system of the invention.

Since the abovementioned amorphous forms of silicon dioxide are very finely divided and hence comparatively difficult to handle, it is advantageous to provide the amorphous silicon dioxide as constituent (B-ii) of component (B) of the two-component system, and not as a separate component. Through the combination with the constituent (B-i), the amorphous silicon dioxide is incorporated into component (B), which thus preferably acquires a gellike or pastelike consistency.

Zeolites (constituent (B-iii) are crystalline aluminosilicates of the general formula $M_{2/z}O \cdot Al_2O_3 \cdot xSiO_2 \cdot yH_2O$, in which M is a cation selected from the group consisting of metal cations (mostly alkali metal or alkaline earth metal cations), $H^+$, and $NH_4^+$, z is the valence of the cation, x=1.8 to 12, and y=0 to 8.

Zeolites are characterized by a framework and pore structure, one of whose consequences is to permit the uptake of water. The crystal lattices of the zeolites are composed of $SiO_4$ and $AlO_4$ tetrahedra, each linked to one another via oxygen bridges and forming rings or prisms.

These in turn join up to form further, secondary structural units, each containing up to 16 Si or Al atoms. This produces a spatial arrangement of identically constructed cavities, which are accessible via windows (pore openings) and/or three-dimensional channel systems. In the crystal lattice of zeolites, there are only SiOAl and/or SiOSi bridges, but no AlOAl bridges. In zeolites, therefore, the Si/Al modulus is greater than or equal to 1.

Preference is given to using zeolites of the zeolite A type with a pore size of 3 angstroms (300 pm=$300*10^{-12}$ m), 4 angstroms (=400 pm) or 5 angstroms (500 pm), more preferably 3 angstroms. Zeolite A is a synthetic, colorless, crystalline aluminosilicate and in its hydrated sodium form has the empirical formula $Na_{12}((AlO_2)_{12}(SiO_2)_{12}) \cdot 27H_2O$.

Further suitable zeolites are listed in the table below:

| | |
|---|---|
| Zeolite X | $Na_{86}[(AlO_2)_{86}(SiO_2)_{106}] \cdot 264\ H_2O$ |
| Zeolite Y | $Na_{56}[(AlO_2)_{56}(SiO_2)_{136}] \cdot 250\ H_2O$ |
| Zeolite L | $K_9[(AlO_2)_9(SiO_2)_{27}] \cdot 22\ H_2O$ |
| Mordenite | $Na_{8.7}[(AlO_2)_{8.7}(SiO_2)_{39.3}] \cdot 24\ H_2O$ |
| ZSM 5 | $Na_{0.3}H_{3.8}[(AlO_2)_{4.1}(SiO_2)_{91.9}]$ |
| ZSM 11 | $Na_{0.1}H_{1.7}[(AlO_2)_{1.8}(SiO_2)_{94.2}]$ |

It has emerged that the addition of zeolites (B-iii) to component (B) of the two-component system of the invention enhances the long-term stability of adhesive bonds produced in accordance with the invention. It is presently assumed that this is attributable to absorption by the zeolite (B-iii) of the water (A-ii) originating from component (A). The loss of water after the adhesive bond has been produced is a process which extends over a number of days and which limits the service life of the adhesive bond if no appropriate countermeasures are taken. Through the use of one or more zeolites as constituent (B-iii), the service life of the adhesive bond is extended (in particularly preferred embodiments, to up to four weeks or longer), since the absorbing action of the zeolites (B-iii) slows down the loss of water. For applications where long adhesive bond service life is not a requirement, however, two-component systems of the invention without constituent (B-iii) are also suitable.

In a further embodiment, component (B) of a two-component system of the invention comprises (B-iv) flyash, preferably flyash from combustion of bituminous coal, preferably flyash from bituminous-coal power stations and also, optionally, components (B-ii) and/or (B-iii) as described above.

The proportion of constituent (A-i) of component (A) to constituent (B-ii) of component (B) of the preferred two-component system of the invention determines the ratio of silicon dioxide to alkali metal oxide in the mixture formed by mixing components (A) and (B), and therefore has a substantial influence on the curing rate of the mixture and on the fraction of binding polysilicic acids in the cured adhesive. In a preferred two-component system of the invention, the ratio
of the total mass of all alkali metal silicates (A-i) of component A
to
the total mass of constituent (B-ii) of component B
is in the range from 10:1 to 70:1, preferably in the range from 20:1 to 50:1, more preferably in the range from 30:1 to 40:1.

Preferably, in component (B) of the two-component system of the invention, the ratio
of the total mass of constituent (B-i)
to
the total mass of amorphous silicon dioxide (B-ii)
is in the range from 2:1 to 20:1, preferably 3:1 to 20:1, more preferably in the range from 5:1 to 10:1.

The compounds of constituent (B-i) of component (B) of the two-component system of the invention are esters which are capable, when component (A) is mixed with component (B), of bringing about curing by the waterglass-ester process, which is known from the technical field of the binders for foundry mold materials.

Preference is given to using, as or in constituent (B-i) of component (B) of the two-component system of the invention, cyclic esters of carbonic acid, of the formula (I)

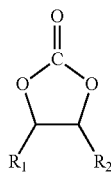

where, in the formula (I), $R_1$ and $R_2$ each independently of one another are selected from the group consisting of hydrogen, unbranched alkyl groups having 1 to 6 carbon atoms, and branched alkyl groups having 4 to 6 carbon atoms. Particularly preferred are the cyclic carbonic esters from the group consisting of ethylene carbonate, propylene carbonate, and butylene carbonate.

Another group of compounds used with preference as or in constituent (B-i) of component (B) of the two-component system of the invention are carboxylic esters of polyhydric alcohols. Polyhydric alcohols are alcohols having two or more hydroxyl groups per molecule. In the esters for use in accordance with the invention, one, two or more, or all of the hydroxyl groups of the polyhydric alcohol are esterified by carboxylic acids. Preference is given to carboxylic esters of polyhydric alcohols from the group consisting of ethylene glycol, diethylene glycol, triethylene glycol, and glycerol.

Preferred in accordance with the invention among the carboxylic esters of polyhydric alcohols from the group consisting of ethylene glycol, diethylene glycol, triethylene glycol are mono- and diacetic esters.

Carboxylic esters of glycerol that are preferred in accordance with the invention are compounds of the formula (II)

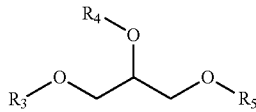

where, in the formula (II), $R_3$, $R_4$, and $R_5$ each independently of one another are selected from the group consisting of hydrogen and acyl groups —$C(O)R_6$, where $R_6$ in the acyl groups independently at each occurrence is selected from the group consisting of unbranched alkyl groups having 1 to 6 carbon atoms and branched alkyl groups having 4 to 6 carbon atoms, with the proviso that at least one of the groups $R_3$, $R_4$, and $R_5$ is an acyl group as here defined. Particularly preferred are mono-, di-, and triacetic esters of glycerol. The diacetic ester of glycerol is also referred to as diacetin. The triacetic ester of glycerol is also referred to as triacetin.

With particular preference constituent (B-i) of component (B) of the two-component system of the invention is formed from a mixture consisting of one or more compounds of the formula (I), such as propylene carbonate, and of one or more compounds of the formula (II), such as the acetic triester of glycerol (triacetin), for example.

In component (A) of the two-component system of the invention, preferably one, two or more or all of the alkali metal silicates (A-i) present are selected from the group consisting of sodium silicate, potassium silicate, and mixtures thereof.

In one preferred embodiment, component (A) of the two-component system of the invention comprises as further constituent (A-iii) one or more fillers selected from the group consisting of aluminosilicates, crystalline forms of silicon dioxide, and magnesium oxide, calcium oxide, chromium oxide, zirconium oxide, aluminum oxide, zirconium silicate, chromite, magnesite, and mixtures thereof.

Constituent (A-iii) contains no alkali metal silicates having a molar ratio of silicon dioxide to alkali metal oxide in the range from 2 to 5 (such silicates are counted as part of constituent (A-i)) and no amorphous forms of silicon dioxide (constituent B-ii). The fillers of constituent (A-iii) are used preferably in the form of naturally occurring minerals. Among the crystalline forms of silicon dioxide, quartz (more particularly in the form of silica sand or finely ground quartz) is preferred. Among the aluminosilicates, preference is given to hydrated aluminosilicates, especially clay minerals and clays, more particularly kaolins and bentonites (comprising the mineral montmorillonite as principal constituent). Another preferred clay is Kärlich blue clay. For foundry applications, the filler or at least one of the fillers is preferably selected such that it is identical to or at least similar to the mold material present in the parts of a foundry mold that are to be joined. Constituent (A-iii) contains no zeolites.

Corresponding fillers are also used in conventional thermosetting waterglass adhesives and are therefore known to the skilled person. Fillers are materials which, when a mixture formed from the two-component system of the invention is cured, undergo little volume contraction, if any. The function of the filler is to adjust the desired dynamic viscosity of component (A), and to attain a desired fill level in the adhesive formed from the two-component system of the invention.

Preferred fillers (A-iii) are those capable, by swelling or otherwise, of binding and/or intercalating water. This is true, for example, of the abovementioned clays and clay minerals. It has emerged that the addition of water-binding fillers (A-iii) to component (A) of the two-component system of the invention enhances the long-term stability of adhesive bonds produced in accordance with the invention. The present assumption is that this is attributable to binding by the water-binding filler (A-iii) of the water (A-ii) originating from component (A). The loss of water after production of the adhesive bond is a process which extends over several days and which limits the service life of the adhesive bond unless suitable countermeasures are taken. The use of one or more water-binding fillers (A-iii) extends the service life of the adhesive bond, since the water-binding effect of the fillers (A-iii) slows down the loss of water. For applications where a long adhesive bond service life is not a requirement, however, two-component systems of the invention without water-binding fillers (A-iii) are also suitable.

In component (A) of the two-component system of the invention, the ratio of (A-i) the total mass of all alkali metal silicates to (A-iii) the total mass of said fillers is preferably in the range from 1:1 to 1:2, preferably 1:1.4 to 1:1.7.

In order to reduce the use of organic materials for applications in the foundry industry, for the reasons described above, it is preferred for the organically bonded carbon content of components (A) and (B) of the two-component system of the invention as a whole to be 6 wt % or less, preferably 5.5 wt % or less, more preferably 4 wt % or less, based on the total mass of components (A) and (B). The carbon fraction is determined via elemental analysis (combustion analysis), preferably by means of the Vario Max CNS system from Elementar.

In one preferred embodiment, component (A) of a two-component system of the invention comprises as further constituents (A-iv) one or more surfactants and/or (A-v) one or more mineral oils.

The sum of the mass fractions of constituents (A-iv) as defined above and (A-v) as defined above is preferably 2 wt % or less, based on the total mass of component (A).

One of the effects of adding surfactants (customarily also referred to as "wetting agents") when a two-component system of the invention is employed as adhesive is to enhance the wetting and adhesion behavior on the surfaces of the articles to be joined. Suitable surfactants include anionic surfactants, especially those with a sulfate, sulfonate, or phosphate group. The anion of the anionic surfactant is preferably selected from the group consisting of oleyl sulfate, stearyl sulfate, palmityl sulfate, myristyl sulfate, lauryl sulfate, decyl sulfate, octyl sulfate, 2-ethylhexyl sulfate, 2-ethyloctyl sulfate, 2-ethyldecyl sulfate, palmitoleyl sulfate, linolyl sulfate, lauryl sulfonate, 2-ethyldecyl sulfonate, palmityl sulfonate, stearyl sulfonate, 2-ethylstearyl sulfonate, linolyl sulfonate, hexyl phosphate, 2-ethylhexyl phosphate, caprylyl phosphate, lauryl phosphate, myristyl phosphate, palmityl phosphate, palmitoleyl phosphate, oleyl phosphate, stearyl phosphate, poly(1,2-ethanediyl)phenol hydroxyphosphate, poly(1,2-ethanediyl) stearyl phosphate, and poly(1,2-ethanediyl)oleyl phosphate. Particularly suitable surfactants are sodium ethylhexyl sulfate and sodium octyl sulfate.

The surfactants (A-iv) are used as pure substances or in the form of aqueous solutions with a surfactant content of 10 wt % or more, based on the weight of the aqueous solution. For calculating the mass fraction of the surfactants (A-iv) in the component (A), however, only the masses of the surfactants themselves are counted. Where surfactants (A-iv) are used in the form of aqueous solutions, their water fraction is to be reckoned part of constituent (A-ii).

The term "mineral oil" is a collective designation for liquid distillation products obtained from mineral raw materials (petroleum, bituminous coal, wood, peat). The major constituent of mineral oils is made up by mixtures of saturated catenated hydrocarbons (paraffins), aromatic hydrocarbons, and alicyclic hydrocarbons (naphthenic hydrocarbons). The addition of mineral oil (A-v) raises the wetting capacity of component (A) and prolongs the time until which component (A) forms a skin as a result of reaction of the alkali metal silicates (A-i) with the $CO_2$ present in the ambient air. This skinning is disruptive and unwanted in the production of adhesive bonds, since it hinders the adhesion of the adhesive to the surfaces of the articles to be joined. The phenomenon of skinning is known for waterglass adhesives. The current assumption is that the addition of mineral oil brings about passivation of the alkali metal silicates (A-i) in respect of the reaction with $CO_2$.

For use in the foundry industry, preference in particular is given to a two-component system of the invention whose components (A) and (B) are harmonized with one another in terms of their composition and their mass ratio in such a way that the mixture formed by mixing of components (A) and (B) has a pot life in the range from one minute to 1 hour, preferably 2 minutes to 1 hour, more preferably in the range from 3 minutes to 30 minutes.

The pot life, also referred to as working time, is the period within which a multicomponent adhesive can be used after its constituents have been mixed. For the two-component systems of the present invention, the pot life is determined by method 4.3 of standard DIN EN 014022. The pot life is determined by the cure rate, which is dependent, as described above, on the composition of components (A) and (B), particularly with regard to constituents (A-i) and (if present) (B-ii). Through a suitable choice of the composition of components (A) and (B), therefore, the pot life can be varied, and two-component systems of the invention with the respectively appropriate pot life can be provided in accordance with the desired application. While pot lives of less than 30 minutes are suitable in particular for foundry application, longer pot lives are acceptable as well for applications in the construction industry.

The mixture formed by mixing components (A) and (B) of the two-component system of the invention is preferably an adhesive.

The mixing of components (A) and (B) of the two-component system of the invention takes place preferably in a static mixing apparatus (as described above).

Particularly preferred in accordance with the invention are two-component systems of the invention which combine two, a plurality or all of the features described above as being preferred.

A further aspect of the present invention relates to a kit for producing an adhesive, comprising a two-component system of the invention, preferably in one of the preferred embodiments described above a static mixing apparatus for mixing components (A) and (B) of this two-component system.

The static mixing apparatus is preferably part of an apparatus for applying an adhesive to a bond site, e.g., an adhesive apparatus of the construction as typically also utilized for the application of organic two-component adhesives such as two-component polyurethane or epoxy adhesives, for example. Such apparatuses are known to the skilled person and typically comprise a two-chamber cartridge and a static mixing apparatus in the form of a mixing tube.

A further aspect of the present invention relates to the use of a two-component system of the invention and, respectively, of a kit of the invention for producing an adhesive bond between articles that are to be joined.

For producing an adhesive bond, the adhesive produced in accordance with the invention is applied to one or more bond sites. A bond site in this context is a coherent region, to which the adhesive is to be applied, on a surface of one of the articles to be joined. The adhesive is applied to a bond site, for example, locally, as for example in the form of a dot having a diameter of 2 mm or less, preferably 1.5 mm or less, or in the form of a bead, typically in the form of a bead having a diameter of 3 mm or less, preferably 2 mm or less. The viscosity of the adhesive should be selected such that it can—if desired—be applied to bond sites of small extent, without running beyond the boundary of the bond site. The use of a two-component system of the invention is not confined to bond sites having the dimensions referred to by way of example here.

Preference is given to the use of a kit of the invention for producing an adhesive bond where the articles to be joined by the adhesive bond comprise, at the bond sites, one or more inorganic materials selected from the group of ceramic materials, more particularly from the group consisting of oxides and silicates.

With particular preference the articles to be joined by the adhesive bond are parts of a foundry mold, and the parts of a foundry mold to be joined preferably each comprise mold base materials which are bound by a binder formed by curing (preferably thermal curing) of one or more alkali metal silicates.

Parts of a foundry mold here are molds (which define the outer contours of the casting to be produced), cores (which define the inner contours of the casting to be produced), and risers, and also parts of such molds, cores, and risers. In this context, for example, by inventive joining of parts of a core, a core is formed; by inventive joining of parts of a mold, a mold is formed; and by inventive joining of parts of a riser, a riser is formed.

The production of foundry molds using waterglass as binder is known in the prior art. Mold base materials used for producing casting molds are materials of general usage, such as silica sand or zircon sand, chamotte, mullite, olivine, chromium ore sand, vermiculite, or other refractory mold base materials. According to standard DIN 51060 "Refractory ceramic raw materials and refractory products", materials are referred to as refractory with resistance to temperatures of >1500° C., and as highly refractory with resistance to temperatures of >1800° C.

One particularly preferred field of application of two-component systems of the invention is the production of adhesive bonds between parts of a riser, and in this context in particular between a riser insert and a breaking core (preferably a Croning breaking core).

A further particularly preferred field of application of two-component systems of the invention is the production of adhesive bonds between parts of gating and/or runner constructions. Constructions of these kinds are typically composed of two or more parts, usually in the form of tubular sections, preferably made from highly refractory ceramic material, with the individual parts being joined to one another by adhesive bonds.

Another particularly preferred field of application of two-component systems of the invention is the production of adhesive bonds between cores or parts of cores.

A further aspect of the present invention relates to the use of a static mixing apparatus for producing an adhesive, the adhesive being produced by mixing of components (A) and (B) of a two-component system of the invention (preferably in one of the above-described preferred embodiments) in the static mixing apparatus.

A further aspect of the present invention relates to a method for producing an adhesive, comprising the step of
mixing components (A) and (B) of a two-component system of the invention (preferably in one of the above-described preferred embodiments).

In the case of the method of the invention for producing an adhesive, the mixing of components (A) and (B) of a two-component system of the invention (preferably in one of the above-described preferred embodiments) takes place preferably in a static mixing apparatus.

A further aspect of the present invention relates to a method for producing an adhesive bond between articles to be joined, comprising the steps of:
producing an adhesive by the method of the invention described above (preferably according to one of the above-described preferred variants of the method of the invention for producing an adhesive)
applying the adhesive to one or more bond sites to form an adhesive bond between the articles to be bonded
curing the adhesive.

In a preferred method of the invention for producing an adhesive bond between articles to be joined, the adhesive produced in accordance with the invention
has a pot life in the range from 2 minutes to 1 hour, preferably in the range from 3 minutes to 30 minutes.

With regard to the effect of the composition and amount of components (A) and (B) of the two-component system of the invention on the pot life of a mixture formed by mixing of components (A) and (B), the observations above apply.

With regard to the articles to be joined by means of the method of the invention for producing an adhesive bond (especially in its preferred embodiments), the observations above apply.

The two-component system of the invention, the kit of the invention, and also the method of the invention are suitable for example for applications in the foundry industry and in the construction industry.

The process of curing of an adhesive formed in accordance with the invention by mixing of components (A) and (B) of a two-component system of the invention is not significantly influenced by the temperature of the articles to be joined. This is an advantage for the application for joining parts of a foundry mold, since foundry molding parts bonded with a thermally cured binder (e.g., waterglass) often still exhibit after curing a certain residual temperature (typically in the range from 40 to 80° C.).

Adhesive bonds produced by the method of the invention are notable for high tensile strength and low sensitivity to changes in the moisture content of the ambient air. Adhesive bonds produced by the method of the invention, particularly using the above-described particularly preferred embodiments of the two-component system of the invention, are also not very sensitive to contact with water, such as when parts of a foundry mold bonded by an adhesive bond are treated, in accordance with the invention, with an aqueous size, for example. Moreover, adhesive bonds produced by the method of the invention exhibit high stability toward thermal loads.

The present invention is elucidated below with working examples.

Two-component systems of the invention (numbers 1 to 13) were produced with the compositions indicated in table 1 below.

The respective components (A) and (B) of the two-component systems 1 to 13 were mixed in a static mixing apparatus.

For systems 1 to 7, a two-chamber cartridge with a volume ratio A:B of 10:1 with a mounted static mixing tube was utilized. 66 g of component A were introduced without bubbles into the first chamber. Introduced likewise without bubbles into the second chamber were 5 g of component B. The cartridge was conditioned at 20° C. Subsequently, with a corresponding ram, after discarding of a minimal initial reaction, 30 g of sample material were expressed from the mixing tube of the cartridge.

For systems 8 to 13, a two-chamber cartridge with a volume ratio A:B of 10:1 with a mounted static mixing tube was utilized. 72 g of component A were introduced without bubbles into the first chamber. Introduced likewise without bubbles into the second chamber were 5 g of component B. The cartridge was conditioned at 20° C. In systems 8 to 13, a mixture consisting of kaolin and finely ground quartz is used as constituent (A-iii), the weight ratio of kaolin to finely ground quartz in this mixture being 2:1.

The pot lives of the mixtures were determined in accordance with standard DIN EN 014022, method 4.3. The results are reported in the table below.

Depending on the composition of components (A) and (B), two-component systems of the invention with different pot lives can be produced. While two-component systems of the invention with pot lives of less than 30 minutes are suitable especially for application to the joining of parts of a foundry mold, the two-component systems of the invention with longer pot lives are appropriate in particular for applications in the construction industry.

The invention claimed is:
1. A two-component system comprising
   a component (A) comprising the constituents
   (A-i) an alkali metal silicate or a mixture of two or more alkali metal silicates, the molar ratio of silicon dioxide to alkali metal oxide in the alkali metal silicate or silicates being in the range from 2 to 5, and
   (A-ii) water
   and
   a component (B) having both constituents (B-i) and (B-iii) present, wherein:
   (B-i) is a compound selected from the group consisting of cyclic esters of carbonic acid, γ-butyrolactone, carboxylic esters of polyhydric alcohols, and a mixture of two or more of the compounds, and
   (B-iii) is one or more zeolites, the mass fraction of constituent (B-iii) being 40 wt % or less, based on the total mass of component (B)
   wherein the ratio
   of the total mass of all alkali metal silicates (A-i) of component (A)
   to
   the total mass of constituent (B-i) of component (B)
   is in the range from 2:1 to 8:1,
   and in the two-component system, components (A) and (B) are arranged in such a way that no constituent of component (A) is able to react with a constituent of component (B).
2. The two-component system as claimed in claim 1, wherein component (B) further comprises constituent (B-ii), wherein:
   (B-ii) is an amorphous silicon dioxide, the amorphous silicon dioxide being selected from the group consist-

TABLE 1

| | Component (A) | | | | | Component (B) | | | | |
|---|---|---|---|---|---|---|---|---|---|---|
| | (A-i) | | | | | (B-i) | | | | |
| System No. | Alkali metal silicate (wt % based on total mass of (A)) | (A-ii) Water (wt % based on total mass of (A)) | (A-iii) Kaolin (wt % based on total mass of (A)) | (A-iv) Surfactant (wt % based on total mass of (A)) | (A-v) Mineral oil (wt % based on total mass of (A)) | Triacetin (wt % based on total mass of (B-i)) | Propylene carbonate (wt % based on total mass of (B-i)) | (B-ii) Fumed silica (wt % based on total mass of (B)) | (B-iii) Zeolite (wt % based on total mass of (B)) | Pot life [min] |
| 1 | 24 | 36 | 40 | 0 | 0 | 0 | 100 | 9 | 0 | 4.5 |
| 2 | 24 | 36 | 40 | 0 | 0 | 35 | 65 | 9 | 0 | 6.5 |
| 3 | 24 | 36 | 40 | 0 | 0 | 65 | 35 | 9 | 0 | 11 |
| 4 | 24 | 36 | 40 | 0 | 0 | 80 | 20 | 9 | 0 | 24 |
| 5 | 24 | 36 | 40 | 0 | 0 | 90 | 10 | 9 | 0 | 60 |
| 7 | 23.76 | 36.14 | 39.6 | 0.5 | 0 | 78 | 22 | 3.9 | 9.3 | 9 |
| 8 | 23.64 | 35.46 | 39.4 | 0.5 | 1.0 | 78 | 22 | 3.9 | 9.3 | 9 |

| | Component (A) | | | | | Component (B) | | | | |
|---|---|---|---|---|---|---|---|---|---|---|
| | (A-i) | | (A-iii): Kaolin/finely ground quartz weight ratio 2:1 | | | (B-i) | | | | |
| System No. | Alkali metal silicate (wt % based on total mass of (A)) | (A-ii) Water (wt % based on total mass of (A)) | (wt % based on total mass of (A)) | (A-iv): Surfactant (wt % based on total mass of (A)) | (A-v): Mineral oil (wt % based on total mass of (A)) | Triacetin (wt % based on total mass of (B-i)) | Propylene carbonate (wt % based on total mass of (B-i)) | (B-ii) Fumed silica (wt % based on total mass of (B)) | (B-iii) Zeolite (wt % based on total mass of (B)) | Pot life [min] |
| 8 | 23 | 44 | 33 | 0 | 0 | 35 | 65 | 9 | 0 | 1 |
| 9 | 23 | 44 | 33 | 0 | 0 | 65 | 35 | 9 | 0 | 3 |
| 10 | 23 | 44 | 33 | 0 | 0 | 90 | 10 | 9 | 0 | 11 |
| 11 | 23 | 44 | 33 | 0 | 0 | 100 | 0 | 5 | 0 | 35 |
| 12 | 22.8 | 44.1 | 32.7 | 0.4 | 0 | 92 | 8 | 5 | 10 | 5 |
| 13 | 22.7 | 43.3 | 32.5 | 0.5 | 1 | 92 | 8 | 5 | 10 | 5 | ing of fumed silicas, precipitated silicas, silica fume, and mixtures thereof, the mass fraction of constituent (B-ii) being 20 wt % or less, based on the total mass of component (B).

3. The two-component system as claimed in claim 2, wherein the ratio in component (B)
of the total mass of constituent (B-i)
to
the total mass of amorphous silicon dioxide (B-ii)
is in the range from 2:1 to 20:1.

4. The two-component system as claimed in claim 1, wherein one, two or more, or all compounds of constituent (B-i) are selected from the group consisting of ethylene carbonate, propylene carbonate, butylene carbonate, and carboxylic esters of polyhydric alcohols, wherein the carboxylic esters of polyhydric alcohols are selected from the group consisting of ethylene glycol, diethylene glycol, triethylene glycol, and glycerol.

5. The two-component system as claimed in claim 1, wherein one, two or more, or all of the alkali metal silicates (A-i) are selected from the group consisting of sodium silicate, potassium silicate, and mixtures thereof.

6. The two-component system as claimed in claim 1, wherein component (A) comprises as a further constituent
(A-iii) one or more fillers selected from the group consisting of aluminosilicates, crystalline forms of silicon dioxide, magnesium oxide, calcium oxide, chromium oxide, zirconium oxide, aluminum oxide, zirconium silicate, chromite, magnesite, and mixtures thereof.

7. The two-component system as claimed in claim 6, wherein the ratio in component (A)
(A-i) of the total mass of all alkali metal silicates
to
(A-iii) the total mass of the fillers
is in the range from 1:1 to 1:2.

8. The two-component system as claimed in claim 2, wherein the ratio
of the total mass of all alkali metal silicates (A-i) of component A
to
the total mass of constituent (B-ii) of component B
is in the range from 10:1 to 70:1.

9. The two-component system as claimed in claim 1, wherein component (A) comprises as further constituents:
(A-iv) one or more surfactants
and/or
(A-v) one or more mineral oils.

10. The two-component system as claimed in claim 9, wherein the sum of the mass fractions of constituents
(A-iv) one or more surfactants and
(A-v) one or more mineral oils
is 2 wt % or less, based on the total mass of component (A).

11. The two-component system as claimed in claim 1, wherein the total amount of organically bonded carbon in components (A) and (B) of the two-component system is 6 wt % or less, based on the total mass of components (A) and (B).

12. The two-component system as claimed in claim 1, wherein components (A) and (B) are coordinated with one another in terms of their composition and their mass ratio in such a way that the mixture formed by mixing components (A) and (B) has a pot life in the range from 2 minutes to 1 hour.

13. A kit for producing an adhesive, comprising
a two-component system as claimed in claim 1, and
a static mixing apparatus for mixing components (A) and (B) of this two-component system.

14. The kit as claimed in claim 13, wherein the static mixing apparatus is part of an apparatus for applying an adhesive to a bond site.

15. A method for producing an adhesive, comprising the step of
mixing components (A) and (B) of a two-component system as claimed in claim 1 in a static mixing apparatus.

16. A method for producing an adhesive bond between articles to be bonded, comprising the steps of
producing an adhesive by a method as claimed in claim 15,
applying the adhesive to one or more bond sites to form an adhesive bond between the articles to be bonded, and
curing the adhesive.

17. The method as claimed in claim 16 for producing an adhesive bond between articles to be bonded, wherein the adhesive has a pot life in the range from 2 min to 1 hour.

18. The method as claimed in claim 16, wherein the articles to be bonded by the adhesive bond comprise at the bond sites one or more inorganic materials, wherein the inorganic materials are ceramic materials.

19. The method as claimed in claim 16 for producing an adhesive bond between articles to be bonded, wherein the articles to be bonded by the adhesive bond are parts of a foundry mold.

20. The two-component system as claimed in claim 1, wherein the mass fraction of constituent (B-iii) is 10-25 wt %, based on the total mass of component (B).

* * * * *